United States Patent
Tao et al.

(10) Patent No.: US 12,382,111 B2
(45) Date of Patent: Aug. 5, 2025

(54) METHOD FOR DATA TRANSMISSION, RECEIVING END, DATA SOURCE AND COMPUTER-READABLE STORAGE MEDIUM

(71) Applicant: ZTE CORPORATION, Shenzhen (CN)

(72) Inventors: Haipeng Tao, Shenzhen (CN); Jun Li, Shenzhen (CN); Shengbao Zhou, Shenzhen (CN); Xin An, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 46 days.

(21) Appl. No.: 18/687,064

(22) PCT Filed: Aug. 5, 2022

(86) PCT No.: PCT/CN2022/110683
§ 371 (c)(1),
(2) Date: Feb. 27, 2024

(87) PCT Pub. No.: WO2023/040508
PCT Pub. Date: Mar. 23, 2023

(65) Prior Publication Data
US 2024/0430493 A1    Dec. 26, 2024

(30) Foreign Application Priority Data
Sep. 15, 2021 (CN) .......................... 202111078324.3

(51) Int. Cl.
*H04N 21/234* (2011.01)
*H04N 21/238* (2011.01)

(52) U.S. Cl.
CPC ......... *H04N 21/234* (2013.01); *H04N 21/238* (2013.01)

(58) Field of Classification Search
None
See application file for complete search history.

(56) References Cited

U.S. PATENT DOCUMENTS

| | | | |
|---|---|---|---|
| 2006/0095943 | A1 | 5/2006 | Demircin et al. |
| 2013/0106984 | A1 | 5/2013 | Wu et al. |

(Continued)

FOREIGN PATENT DOCUMENTS

| | | | |
|---|---|---|---|
| CN | 101917612 | A | 12/2010 |
| CN | 102457727 | A | 5/2012 |

(Continued)

OTHER PUBLICATIONS

International Searching Authority. International Search Report and Written Opinion for PCT Application No. PCT/CN2022/110683 and English translation, mailed Oct. 21, 2022, pp. 1-11.

(Continued)

*Primary Examiner* — Junior O Mendoza
(74) *Attorney, Agent, or Firm* — Vivacqua Crane, PLLC

(57) ABSTRACT

A method for data transmission, a receiving end, a data source and a computer-readable storage medium are provided. The method may include acquiring a first transmission moment for key data of a newly accessed data source, and a second transmission moment for the key data of a previously accessed data source; generating a new first transmission moment according to the second transmission moment and a preset interval, in response to an interval between the first transmission moment and the second transmission moment being less than the preset interval; where the interval between the new first transmission moment and the second transmission moment is greater than or equal to the preset interval; and sending the new first transmission moment to the newly accessed data source, such that the newly accessed data source transmits the key (Continued)

data to the receiving end according to the new first transmission moment.

18 Claims, 6 Drawing Sheets

(56) References Cited

U.S. PATENT DOCUMENTS

2017/0272811 A1* 9/2017 Zan .................... H04N 21/8455
2021/0337255 A1  10/2021 Zhao
2023/0007188 A1* 1/2023 Han ................. H04N 21/44209

FOREIGN PATENT DOCUMENTS

| CN | 112203100 A | 1/2021 |
| CN | 112399141 A | 2/2021 |
| CN | 113259717 A | 8/2021 |
| CN | 113302928 A | 8/2021 |

OTHER PUBLICATIONS

European Patent Office. Extended European Search Report for EP Application No. 22868885.9, mailed Sep. 16, 2024, pp. 1-70.

* cited by examiner

I frame interval 50    I frame interval 50

METHOD FOR DATA TRANSMISSION, RECEIVING END, DATA SOURCE AND COMPUTER-READABLE STORAGE MEDIUM

CROSS-REFERENCE TO RELATED APPLICATION

This application is a national stage filing under 35 U.S.C. § 371 of international application number PCT/CN2022/110683, filed Aug. 5, 2022, which claims priority to Chinese patent application No. 202111078324.3 filed Sep. 15, 2021. The contents of these applications are incorporated herein by reference in their entirety.

TECHNICAL FIELD

The present disclosure relates to but is not limited to the technical field of communication, and in particular to a method for data transmission, a receiving end, a data source, and a computer-readable storage medium.

BACKGROUND

Generally, encoding and decoding are necessary for data transmission, such as image data transmission for videos. In particular, an encoder encodes a plurality of images to produce a multi-segment GOP (Group of Pictures), and a decoder reads the multi-segment GOP for decoding and then renders the pictures. GOP is a group of continuous pictures, which consists of one I frame (key frame) and a plurality of B frames (bidirectional reference frames) or P frames (forward reference frames). GOP is a basic unit accessed by video and image encoders and decoders. Specifically, I frame is a complete picture, while B frame and P frame record the changes relative to I frame. Without I frame, P frame and B frame cannot be decoded.

In order to improve the fluency of the video, most of the video decoding currently only transmits the I frames and P frames. Since the P frame is a prediction frame based on the I frame, the I frame carries the most basic information, so the I frame requires the largest transmission bandwidth. In a system with limited transmission bandwidth, in the case that a plurality of videos are transmitted concurrently, the I frames of the plurality of videos may also have to be transmitted concurrently. In such a case, the transmission bandwidth may be insufficient, thus the limited bandwidth may pose a limitation to the number of channels for videos to be transmitted.

SUMMARY

The following is a summary of the subject matter described herein. This summary is not intended to limit the scope of protection of the claims.

Provided are a method for data transmission, a receiving end, a data source, and a computer-readable storage medium in some embodiments of the present disclosure, by means of which, reliable transmission of more data information under the condition of limited bandwidth and increase in the number of channels for data transmission are possible.

According to an embodiment of the present disclosure, there is provided a method for data transmission, which is applied to a receiving end, the method may include, acquiring a first transmission moment for key data of a newly accessed data source, and a second transmission moment for key data of a previously accessed data source; generating a new first transmission moment according to the second transmission moment and a preset interval, in response to an interval between the first transmission moment and the second transmission moment being less than the preset interval; where an interval between the new first transmission moment and the second transmission moment is greater than or equal to the preset interval; and sending the new first transmission moment to the newly accessed data source, such that the newly accessed data source transmits the key data to the receiving end according to the new first transmission moment.

According to an embodiment of the present disclosure, there is provided a method for data transmission, which is applied to a receiving end, the method may include, receiving a request for allocation from a newly accessed data source, and acquiring a second transmission moment for key data of a previously accessed data source according to the request for allocation; generating a first transmission moment according to the second transmission moment and a preset interval; where the interval between the first transmission moment and the second transmission moment is greater than or equal to the preset interval; and sending the first transmission moment to the newly accessed data source, such that the newly accessed data source transmits the key data to the receiving end according to the first transmission moment.

According to an embodiment of the present disclosure, there is provided a method for data transmission, which is applied to a newly accessed data source, the method may include, sending key data to a receiving end, such that the receiving end compares a first transmission moment for the key data of the newly accessed data source with a second transmission moment for the key data of a previously accessed data source; and receiving a new first transmission moment fed back by the receiving end, and sending the key data to the receiving end according to the new first transmission moment; where the new first transmission moment is generated by the receiving end in response to the interval between the first transmission moment and the second transmission moment being less than the preset interval, and an interval between the new first transmission moment and the second transmission moment is greater than or equal to the preset interval.

According to an embodiment of the present disclosure, there is provided a method for data transmission, which is applied to a newly accessed data source, the method may include, sending a request for allocation to a receiving end, such that the receiving end generates a first transmission moment based on the request for allocation and according to the preset interval and a second transmission moment for the key data of a previously accessed data source; where the interval between the first transmission moment and the second transmission moment is greater than or equal to the preset interval; and receiving the first transmission moment fed back by the receiving end, and sending the key data to the receiving end according to the first transmission moment.

According to an embodiment of the present disclosure, there is provided a receiving end, which may include a memory, a processor, and a computer program stored in the memory and executable on the processor which, when executed by the processor, causes the processor to carry out any one of the methods applied to the receiving end as described above.

According to an embodiment of the present disclosure, there is provided a data source, which may include a memory, a processor, and a computer program stored in the memory and executable on the processor which, when executed by the processor, causes the processor to carry out any one of the methods applied to the newly accessed data source as described above.

According to an embodiment of the present disclosure, there is provided a computer-readable storage medium storing a computer-executable instruction which, when executed by a processor causes the processor to carry out any one of the methods as described above.

According to an embodiment of the present disclosure, reliable transmission of more data information under the condition of limited bandwidth and an increase in the number of channels for data transmission is possible.

Other features and advantages of the present disclosure will be illustrated in the following description, and in part will be apparent from the description, or may be understood by practicing the present disclosure. The objects and other advantages of the present disclosure can be achieved and obtained by the structure particularly set forth in the description, claims, and drawings.

BRIEF DESCRIPTION OF DRAWINGS

The drawings are intended to provide a further understanding of the technical scheme of the present disclosure, and constitute a part of the specification, and they are intended to illustrate the technical scheme of the present disclosure in conjunction with the embodiments of the present disclosure, but are not intended to limit the technical scheme of the present disclosure.

DETAILED DESCRIPTION

The purpose, technical scheme and advantages of the present disclosure will become apparent through the following description for various embodiments in conjunction with the drawings. It should be understood that the embodiments described here are intended for illustration but not limitation to the present disclosure.

It should be noted that although the devices are shown with individual functional modules in the schematic diagram and the logical sequences are shown in the flow chart, in some cases, the devices can have different modules than those shown and the steps can be executed in a different order than those shown. The terms "first" and "second", if used in the description, claims and the drawings are intended to distinguish similar objects, and do not necessarily imply any specific order or sequence.

Figure 1:
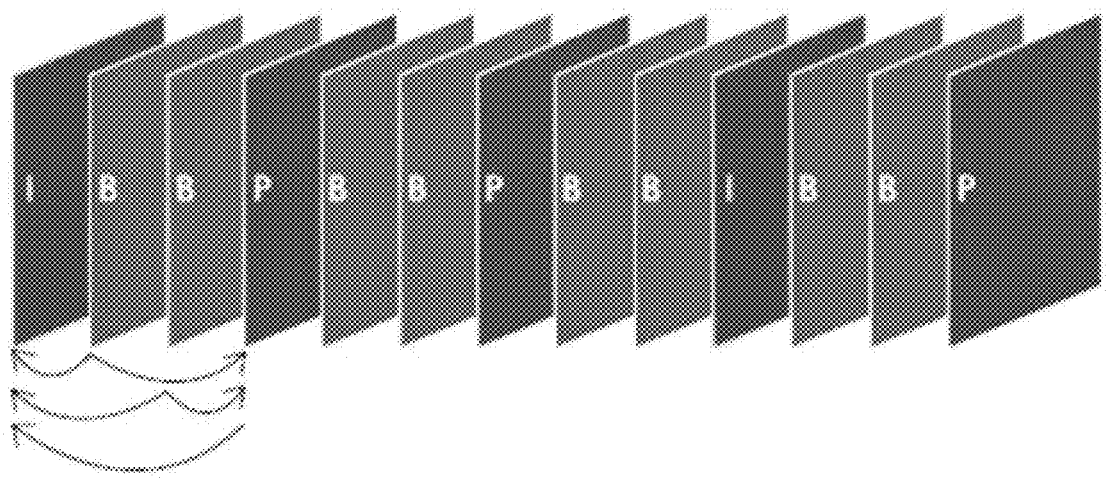
FIG. 1 depicts a schematic diagram showing the arrangement of I frames, B frames, and P frames in a video frame according to an embodiment of the present disclosure.

In the related art, the original image data in video as well as the audio sampling data are compressed with an encoding format. Encoding and compression are really beneficial to video storage and transmission. Correspondingly, decoding is also needed during the playback of the video. Therefore, it is clear that an agreement shall be made between the encoding and decoding, that both the encoder and the decoder can understand. In terms of the encoding and decoding for the videos and images, the following agreement may be followed in which, an encoder encodes a plurality of images to produce a multi-segment GOP (Group of Pictures), and a decoder reads the multi-segment GOP for decoding and then renders the pictures. GOP is a collection of successive pictures, which consists of one I frame (key frame) and a plurality of B frames (bidirectional reference frames) or P frames (forward reference frames) with a well-defined order. GOP is a basic unit accessed by video and image encoders and decoders. The arrangement with the well-defined order would repeat and repeat until the end of the video. In particular, I frame is an intra-coded frame (also called a key frame), P frame is a forward prediction frame (also called a forward reference frame), and B frame is a bidirectional interpolation frame (also called a bidirectional reference frame). Specifically, I frame is a complete picture, while B frame and P frame record the changes relative to I frame. Without I frame, P frame and B frame cannot be decoded. FIG. 1 depicts a schematic diagram showing the arrangement of I frames, B frames and P frames in a video frame according to an embodiment of the present disclosure. A GOP in FIG. 1 sequentially includes one I frame, two B frames, one P frame, two B frames, one P frame and two B frames.

Figure 2:
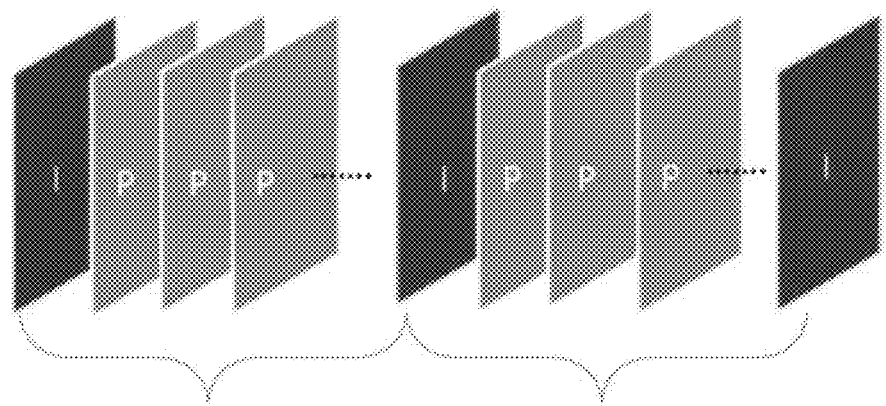
FIG. 2 depicts a schematic diagram showing the arrangement of I frames, B frames, and P frames in a video frame according to an embodiment of the present disclosure.

Based on the above encoding and decoding technology, for the video monitoring system, the preview video picture in the video monitoring system is real-time, which requires high fluency of the pictures. In order to improve the fluency of the pictures, video transmission with I-frames and P-frames can improve the adaptability of the network and reduce the decoding cost. Hence, currently, I-frame and P-frame are chosen for transmission generally in most video decoding. FIG. 2 depicts a schematic diagram showing the arrangement of I frames, B frames and P frames in a video frame according to an embodiment of the present disclosure. It can be seen that in FIG. 2, only 49 P frames are present between the two I frames, without B frames.

Figure 3:
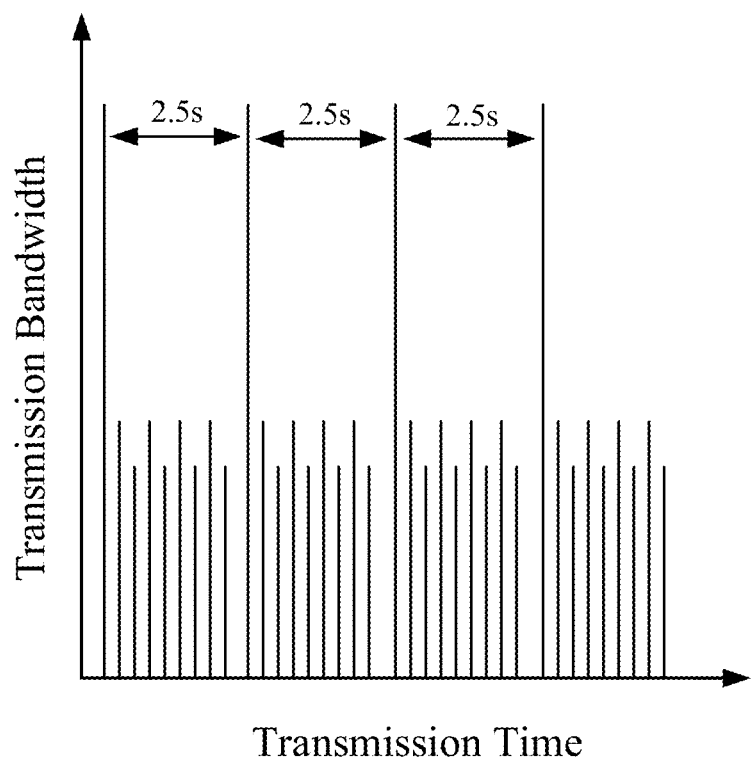
FIG. 3 depicts a schematic diagram showing the transmission bandwidth of a single channel of I-frame and P-frames according to an embodiment of the present disclosure.

In addition, since the P frame is a prediction based on the I frame, the I frame carries the most basic information, so I frame requires the largest transmission bandwidth. FIG. 3 depicts a schematic diagram showing the transmission bandwidth of a single channel of I-frame and P-frames according to an embodiment of the present disclosure. It can be seen that an I-frame is sent every 2.5 seconds in FIG. 3, and compared with P-frames between the I-frames, I-frames take up larger bit spaces and require larger transmission bandwidth.

In addition, a person would not be aware of video lag when the transmission time of I frame is less than 100 ms. And a lot of statistical analysis of data indicates that, the bandwidth requirement of I frame is 6-10 times the bitrate.

TABLE 1

| Feature | Resolution | I frame size Mbit | I frame rate Mbps | Bitrate Mbps | Fundamental level code-rate ratio | Excellent code-rate ratio |
| --- | --- | --- | --- | --- | --- | --- |
| A | 4K | 3.41 | 34.1 | 4 | 10 | 20 |
| B | 4K | 9.12 | 91.2 | 8 | 10 | 20 |
| C | 2K | 1.13 | 11.3 | 2 | 6 | 12 |
| D | 2K | 2.32 | 23.2 | 4 | 6 | 12 |

As shown in Table 1, in a system with limited transmission bandwidth, in the case that a plurality channels of videos are transmitted concurrently, the I frames of the plurality channels of videos may also have to be transmitted concurrently. In such a case, the transmission bandwidth may be insufficient, thus the limited bandwidth may pose a limitation to the number of channels for videos to be transmitted. Table 1 shows by way of an example, for video with feature A, a resolution of 4K, and an I frame of 3.41 Mbit, the video is to be transmitted at no less than 34.1 Mbps to ensure the smooth playback of the video. If I-frames of three or more channels of videos with feature A are transmitted almost concurrently in a video transmission system with a bandwidth of 100 Mbps, since 34.1×3>100, it can be seen that the concurrent transmission of three channels of I frames for videos with feature A in a video transmission system with a bandwidth of 100 Mbps will lead to significant non-fluency in video playback.

In some cases, in order to lower the bandwidth for transmission, P frames are generally employed for transmission, and I frames will only be applied if an error is present in the decoder. Another approach is to reduce the non-fluency in video playback by buffering video data, but it is not so effective for live video and real-time video surveillance.

In view of this, a method for data transmission, a receiving end, a data source, and a computer-readable storage medium are provided, in which the following two schemes are included.

Scheme #1: A newly accessed data source sends key data to a receiving end. The receiving end then obtains the first transmission moment of the key data from the newly accessed data source and the second transmission moment of the key data from a previously accessed data source. When the interval between the first transmission moment and the second transmission moment is less than a preset interval, the receiving end generates a new first transmission moment according to the second transmission moment and the preset interval, where an interval between the new first transmission moment and the second transmission moment is greater than or equal to the preset interval. Then, the receiving end sends the new first transmission moment to the newly accessed data source. The newly accessed data source receives the new first transmission moment fed back by the receiving end and transmits the key data to the receiving end according to the new first transmission moment.

According to the above-described scheme #1, the receiving end generates and sends the new first transmission moment to the newly accessed data source, such that the newly accessed data source transmits the key data to the receiving end according to the new first transmission moment. Since the interval between the new first transmission moment and the second transmission moment is greater than or equal to the preset interval, the collision between the transmissions of the key data from the newly accessed data source and the key data from the previously accessed data source due to time conflict can be reduced. Thereby, according to an embodiment of the present disclosure, it is possible to reliably transmit more data information under the condition of limited bandwidth, thus increasing the number of channels for data transmission.

Scheme #2: A newly accessed data source sends a request for allocation to a receiving end. The receiving end receives the request for allocation from the newly accessed data source, obtains a second transmission moment of key data of the previously accessed data source according to the request for allocation. Then the receiving end generates a first transmission moment according to the second transmission moment and a preset interval, where the interval between the first transmission moment and the second transmission moment is greater than or equal to the preset interval. Then, the receiving end sends the first transmission moment to the newly accessed data source. The newly accessed data source receives the first transmission moment fed back by the receiving end and transmits the key data to the receiving end according to the first transmission moment.

According to the above-described scheme #2, the receiving end generates and sends the first transmission moment to the newly accessed data source, such that the newly accessed data source transmits the key data to the receiving end according to the first transmission moment. Since the interval between the first transmission moment and the second transmission moment is greater than or equal to the preset interval, the collision between the transmissions of the key data from the newly accessed data source and the key data from the previously accessed data source due to time conflict can be reduced. Thereby, according to an embodiment of the present disclosure, it is possible to reliably transmit more data information under the condition of limited bandwidth, thus increasing the number of channels for data transmission.

Some embodiments of the present disclosure will be further illustrated with reference to the drawings.

Figure 4:
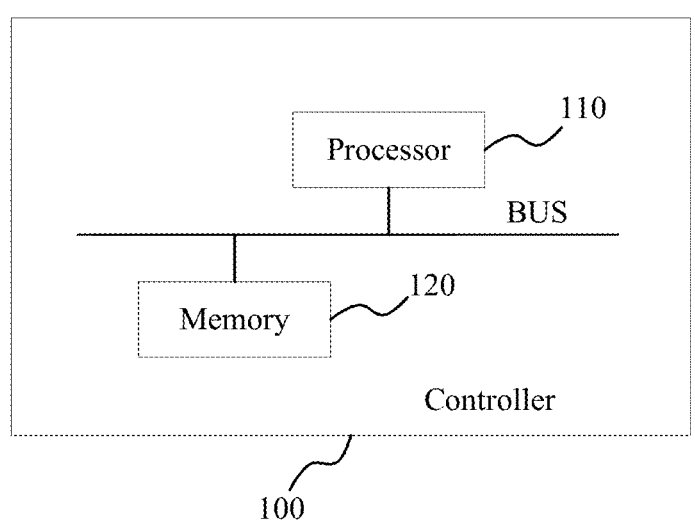
FIG. 4 depicts a schematic diagram showing a controller configured to carry out a method for data transmission according to an embodiment of the present disclosure.

FIG. 4 depicts a schematic diagram showing a controller configured to carry out a method for data transmission according to an embodiment of the present disclosure.

In the embodiment shown in FIG. 4, the controller 100 is provided with a processor 110 and a memory 120 connected by a bus or other means. The connection is shown as bus by way of an example in FIG. 4.

As a non-transitory computer-readable storage medium, the memory 120 can be configured to store non-transitory software programs and non-transitory computer-executable programs. In addition, the memory 120 can include high-speed random-access memory and non-transitory memory, such as at least one disk memory device, flash memory device, or other non-transitory solid-state memory devices. In some implementations, the memory 120 may include memories 120 remotely located relative to the processor 110, and these remote memories may be connected to the controller through a network. Examples of the above networks include, but are not limited to, the Internet, intranet, local area network, mobile communication network, and combinations thereof.

It can be understood by those having ordinary skills in the art that the controller can be applied to a 3G communication network system, LTE communication network system, 5G communication network system, or subsequently evolved mobile communication network systems, etc. This embodiment is not limited thereto.

It can be understood by those having ordinary skills in the art that the controller shown in FIG. 4 does not constitute a limitation to the embodiment of the present disclosure, and may include more or less components than those shown, or some components may be combined, or have different component arrangements.

In the controller shown in FIG. 4, the processor 110 can call the program for data transmission stored in the memory 120, to perform the method for data transmission.

Based on the controller described in the above embodiment, several embodiments of the method for data transmission of the present disclosure are proposed below with reference to FIGS. 5 to 9.

Figure 5:
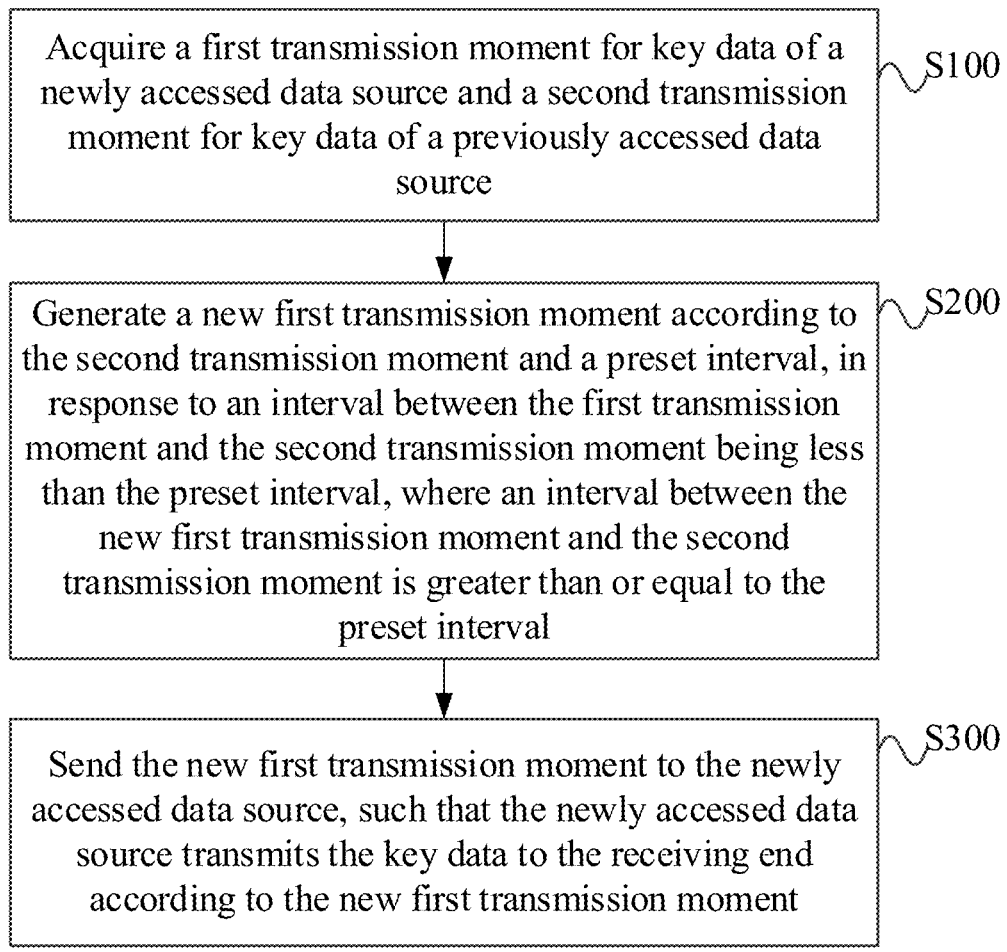
FIG. 5 depicts a flowchart showing a method for data transmission according to an embodiment of the present disclosure.

FIG. 5 depicts a flowchart showing a method for data transmission according to an embodiment of the present disclosure. The method is applied to a receiving end, and includes but is not limited to operations S100, S200, and S300.

At S100, a first transmission moment for key data of a newly accessed data source and a second transmission moment for key data of a previously accessed data source are acquired.

At S200, a new first transmission moment is generated according to the second transmission moment and a preset interval, in response to an interval between the first transmission moment and the second transmission moment being less than the preset interval, where an interval between the new first transmission moment and the second transmission moment is greater than or equal to the preset interval.

At S300, the new first transmission moment is sent to the newly accessed data source, such that the newly accessed data source transmits the key data to the receiving end according to the new first transmission moment.

In an implementation, the newly accessed data source directly sends the key data to the receiving end. The receiving end acquires the first transmission moment for the key data of the newly accessed data source and the second transmission moment for the key data of a previously accessed data source. The case where the interval between the first transmission moment and the second transmission moment is less than a preset interval, indicates that the transmission of the key data of the newly accessed data source and the key data of the previously accessed data source may collide due to time conflict. Hence, the receiving end generates a new first transmission moment according to the second transmission moment and the preset interval, where the interval between the new first transmission moment and the second transmission moment is greater than or equal to the preset interval. Then, the receiving end sends the new first transmission moment to the newly accessed data source, such that the newly accessed data source receives the new first transmission moment and transmits the key data to the receiving end according to the new first transmission moment. According to the above description, the receiving end generates and sends the new first transmission moment to the newly accessed data source, such that the newly accessed data source transmits the key data to the receiving end according to the new first transmission moment. Since the interval between the new first transmission moment and the second transmission moment is greater than or equal to the preset interval, the collision between the transmissions of the key data from the newly accessed data source and the key data from the previously accessed data source due to time conflict can be reduced. Thereby, according to an embodiment of the present disclosure, it is possible to reliably transmit more data information under the condition of limited bandwidth, thus increasing the number of channels for data transmission.

It should be noted that each of the previously accessed data source and the newly accessed data source as described above is one of, a video and image data source, an audio data source, or a data source of another type.

Further, it should be noted that, in an example where the previously accessed data source and the newly accessed data source are video and image data sources, the key data corresponds to the I frames sent by the video and image data source.

In addition, it should be noted that the duration of the preset interval discussed above can be preset manually.

Figure 6:
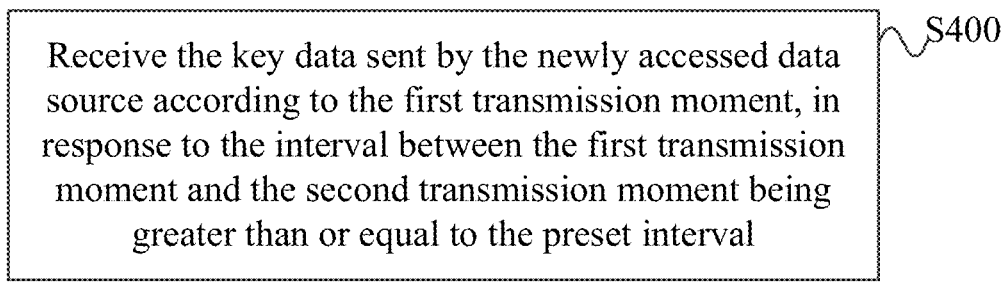
FIG. 6 depicts a flowchart showing a method for data transmission according to another embodiment of the present disclosure.

FIG. 6 depicts a flowchart showing a method for data transmission according to another embodiment of the present disclosure. As shown in FIG. 6, the method further includes but is not limited to operation S400 after the above operation S100.

At S400, the key data sent by the newly accessed data source according to the first transmission moment is received, in response to the interval between the first transmission moment and the second transmission moment being greater than or equal to the preset interval.

In an embodiment, the newly accessed data source directly sends the key data to the receiving end. The receiving end acquires the first transmission moment for the key data of the newly accessed data source and the second transmission moment for the key data of a previously accessed data source. The case where the interval between the first transmission moment and the second transmission moment is larger than or equal to the preset interval, indicates that the time for transmission of the key data of the newly accessed data source and the key data of the accessed data source would not conflict. Hence, the collision of the key data from the newly accessed data source and the previously accessed data source would not occur. Thus, the receiving end continues to receive the key data sent by the newly accessed data source according to the first transmission moment and the reference data corresponding to the key data.

Further, it should be noted that, in an example where the previously accessed data source and the newly accessed data source are video and image data sources, the key data corresponds to the I frames sent by the video and image data source, and the reference data may be the B frames and/or the P frames.

Figure 7:
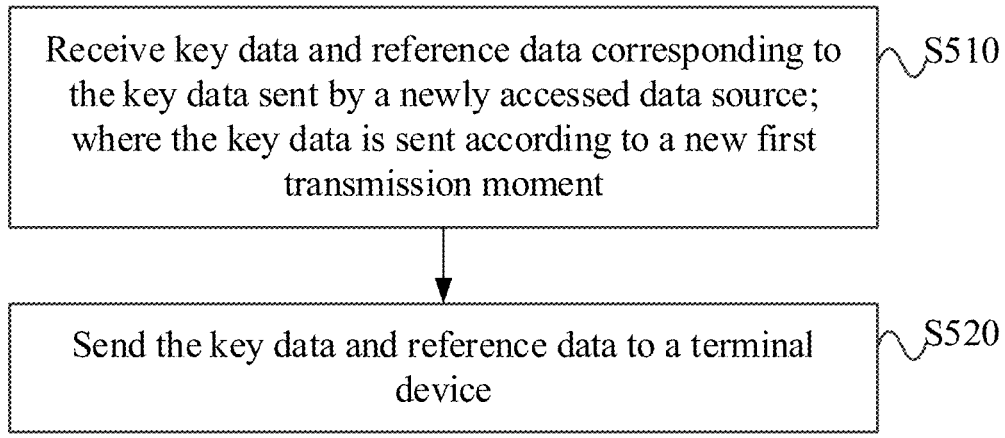
FIG. 7 depicts a flowchart showing a method for data transmission according to another embodiment of the present disclosure.

FIG. 7 depicts a flowchart showing a method for data transmission according to another embodiment of the present disclosure. As shown in FIG. 7, after the above operation S300, the method further includes but is not limited to operations S510 and S520.

At S510, key data and reference data corresponding to the key data from a newly accessed data source are received; where the key data is sent according to a new first transmission moment.

At S520, the key data and reference data are sent to a terminal device.

In an implementation, after the receiving end sends the new first transmission moment to the newly accessed data source, the newly accessed data source transmits the key data to the receiving end according to the new first transmission moment. Then the receiving end receives the key data and reference data corresponding to the key data from the newly accessed data source, where the key data is sent according to the new first transmission moment. Since the interval between the new first transmission moment and the second transmission moment is greater than or equal to the preset interval, no time conflict occurs between the key data retransmitted by the newly accessed data source and the key data of the previously accessed data source. And thus, the key data retransmitted by the newly accessed data source and the key data of the previously accessed data source will not collide. As a consequence, the receiving end can successfully receive the key data and the reference data corresponding to the key data from the newly accessed data source, where the key data is sent according to the new first transmission moment, and send the key data and the reference data to the terminal device.

It should be noted that the terminal device described above may be a terminal device for live video broadcasting. In an example, the terminal device is a video monitoring device.

Based on the method for data transmission applied to the receiving end described with respect to FIGS. 5 to 7, several embodiments regarding the method for data transmission applied to a data source end are provided below.

Figure 8:
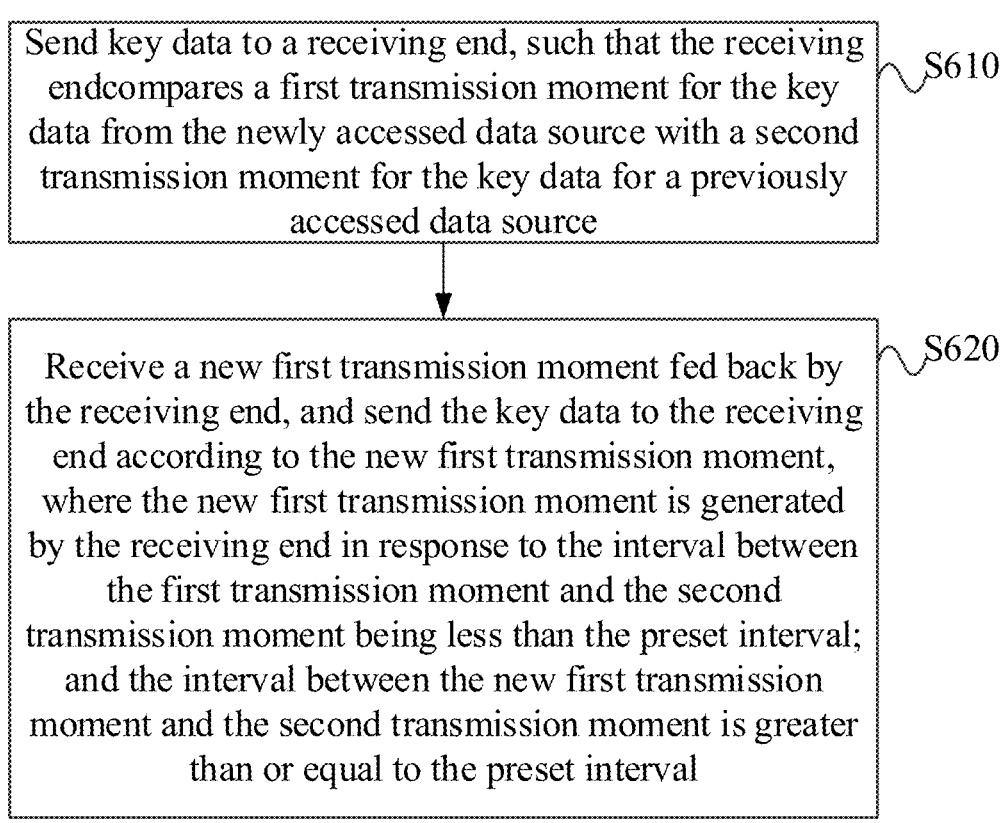
FIG. 8 depicts a flowchart showing a method for data transmission according to an embodiment of the present disclosure.

FIG. 8 depicts a flowchart showing a method for data transmission according to an embodiment of the present disclosure. The method is applied to a newly accessed data source, and includes but is not limited to operations S610 and S620.

At S610, key data is sent to a receiving end, such that the receiving end compares a first transmission moment for the key data from the newly accessed data source with a second transmission moment for the key data for a previously accessed data source.

At S620, a new first transmission moment fed back by the receiving end is received, and the key data is sent to the receiving end according to the new first transmission moment, where the new first transmission moment is generated by the receiving end in response to the interval between the first transmission moment and the second transmission moment being less than the preset interval, and an interval between the new first transmission moment and the second transmission moment is greater than or equal to the preset interval.

In an implementation, after the newly accessed data source directly sends the key data to the receiving end, the receiving end acquires the first transmission moment for the key data of the newly accessed data source and the second transmission moment for the key data of the previously accessed data source. The case where the interval between the first transmission moment and the second transmission moment is less than the preset interval, indicates that the transmissions of the key data of the newly accessed data source and the key data of the previously accessed data source may collide due to time conflict. Therefore, the receiving end responds, and generates a new first transmission moment according to the second transmission moment and the preset interval, where the interval between the new first transmission moment and the second transmission moment is greater than or equal to the preset interval. Then, the receiving end sends the new first transmission moment to the newly accessed data source, so that the newly accessed data source transmits the key data to the receiving end according to the new first transmission moment. According to the above description, the receiving end generates and sends the new first transmission moment to the newly accessed data source, such that the newly accessed data source transmits the key data to the receiving end according to the new first transmission moment. Since the interval between the new first transmission moment and the second transmission moment is greater than or equal to the preset interval, the collision between the transmissions of the key data from the newly accessed data source and the key data from the previously accessed data source due to time conflict can be reduced. Thereby, according to an embodiment of the present disclosure, it is possible to reliably transmit more data information under the condition of limited bandwidth, thus increasing the number of channels for data transmission.

It is to be noted that the implementation and corresponding technical effects of the method for data transmission applied to the data source side described in the embodiment shown in FIG. 8 correspond to those of the method for data transmission applied to the receiving end described in the embodiments shown in FIGS. 5 to 7.

Figure 9:
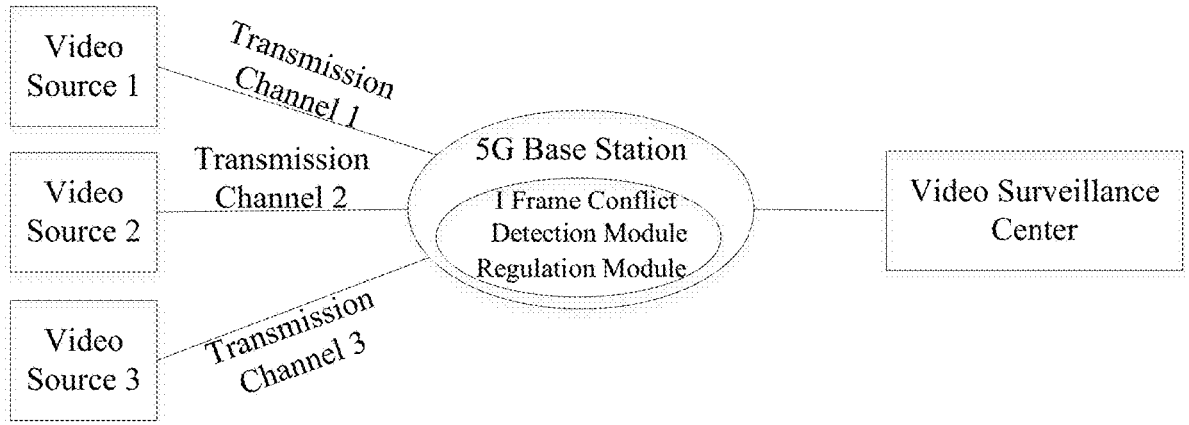
FIG. 9 depicts a schematic diagram showing a system architecture according to an embodiment of the present disclosure.

An embodiment regarding an entire system is provided below based on the method for data transmission described with respect to FIGS. 5 to 8. FIG. 9 depicts a schematic diagram showing an architecture of a system according to an embodiment of the present disclosure.

In an embodiment, a system with a 5G base station is illustrated by way of an example. In an embodiment of the present disclosure, an I frame conflict detection module and a regulation module can be additionally provided in the 5G system, where the I-frame conflict detection module is configured to detect parameters such as the time when the I-frame of the video source arrives the 5G system. If a parameter, such as the time when the I-frame is transmitted, of the newly accessed video source conflicts with that of the previously accessed video source, then the regulation module designates the time when the I frames shall be generated and transmitted for the newly accessed video source according to the I frame interval and the time for transmission of the I frames existed in the system, and notifies the newly accessed video source. Then the newly accessed video source transmits the I frames according to the time when the I frames shall be generated and transmitted designated by the regulation module.

It shall be noted that in an embodiment of the present disclosure, the I-frame conflict detection module and the regulation module can be embedded in the 5G system or deployed between the video source and the 5G system.

Based on the controller described in the above embodiment, several embodiments of the method for data transmission of the present disclosure, are proposed below, with reference to FIGS. 10 to 13.

Figure 10:
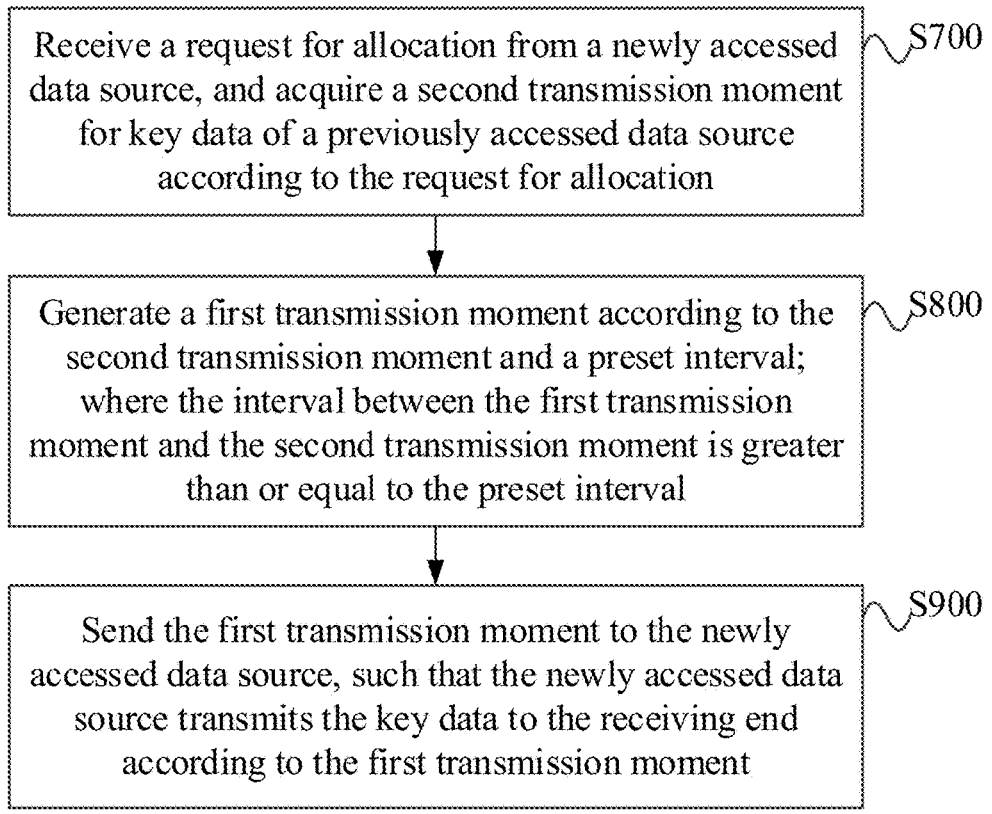
FIG. 10 depicts a flowchart showing a method for data transmission according to an embodiment of the present disclosure.

FIG. 10 depicts a flowchart showing a method for data transmission according to an embodiment of the present disclosure. The method is applied to a receiving end, and includes but is not limited to operations S700, S800, and S900.

At S700, a request for allocation from a newly accessed data source is received, and a second transmission moment for key data of a previously accessed data source is acquired according to the request for allocation.

At S800, a first transmission moment is generated according to the second transmission moment and a preset interval;

where the interval between the first transmission moment and the second transmission moment is greater than or equal to the preset interval.

At S900, the first transmission moment is sent to the newly accessed data source, such that the newly accessed data source transmits the key data to the receiving end according to the first transmission moment.

In an implementation, during an initial access, a newly accessed data source sends a request for allocation to a receiving end. The receiving end receives the request for allocation from the newly accessed data source, obtains a second transmission moment of key data of the previously accessed data source according to the request for allocation, Then the receiving end generates a first transmission moment according to the second transmission moment and a preset interval, where the interval between the first transmission moment and the second transmission moment is greater than or equal to the preset interval. Then, the receiving end sends the first transmission moment to the newly accessed data source. The newly accessed data source receives the first transmission moment fed back by the receiving end and transmits the key data to the receiving end according to the first transmission moment. From the above description, it can be seen that the newly accessed data source does not directly send the key data during the initial access, instead, the newly accessed data source sends a request for allocation to the receiving end, such that the receiving end allocates the first transmission moment for the key data for the newly accessed data source. Since the interval between the first transmission moment and the second transmission moment is greater than or equal to the preset interval, the collision between the key data from the newly accessed data source and the key data from the previously accessed data source due to time conflict can be alleviated. Therefore, according to an embodiment of the present disclosure, reliable transmission of more data information under the condition of limited bandwidth and an increase in the number of channels for data transmission is possible.

It should be noted that each of the previously accessed data source and the newly accessed data source as described above is one of, a video and image data source, an audio data source, or a data source of another type.

Further, it should be noted that, in an example where the previously accessed data source and the newly accessed data source are video and image data sources, the key data corresponds to the I frames sent by the video and image data source.

In addition, it should be noted that the duration of the preset interval discussed above can be preset manually.

Figure 11:
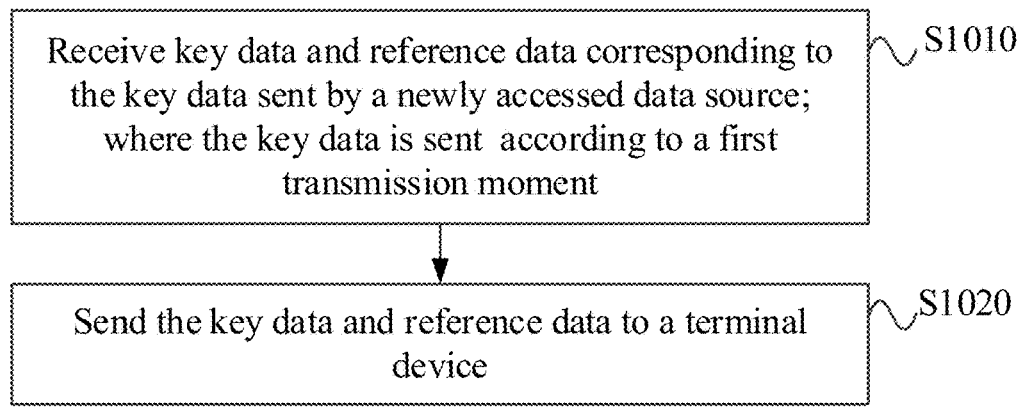
FIG. 11 depicts a flowchart showing a method for data transmission according to another embodiment of the present disclosure.

FIG. 11 depicts a flowchart showing a method for data transmission according to another embodiment of the present disclosure. As shown in FIG. 11, after the above operation S900, the method further includes but is not limited to operations S1010 and S1020.

At S1010, key data and reference data corresponding to the key data sent by a newly accessed data source are received; where the key data is sent according to a first transmission moment.

At S1020, the key data and reference data are sent to a terminal device.

In an implementation, after the receiving end sends the first transmission moment to the newly accessed data source, the newly accessed data source transmits the key data to the receiving end according to the first transmission moment. Then the receiving end receives the key data and reference data corresponding to the key data from the newly accessed data source, where the key data is sent according to the first transmission moment. Since the interval between the first transmission moment and the second transmission moment is greater than or equal to the preset interval, no time conflict occurs between the key data transmitted by the newly accessed data source and the key data of the previously accessed data source. Thus, the key data transmitted by the newly accessed data source and the key data of the previously accessed data source will not collide. As a consequence, the receiving end can successfully receive the key data and the reference data corresponding to the key data from the newly accessed data source, where the key data is sent according to the first transmission moment, and send the key data and the reference data to the terminal device.

Further, it should be noted that, in an example where the previously accessed data source and the newly accessed data source are video and image data sources, the key data corresponds to the I frames sent by the video and image data source, and the reference data may be the B frames and/or the P frames.

Further, it should be noted that the terminal device described above may be a terminal device for live video broadcasting. In an example, the terminal device is a video monitoring device.

Based on the method for data transmission applied to the receiving end described with respect to FIGS. 10 to 11, several embodiments regarding the method for data transmission applied to a data source end are provided below.

Figure 12:
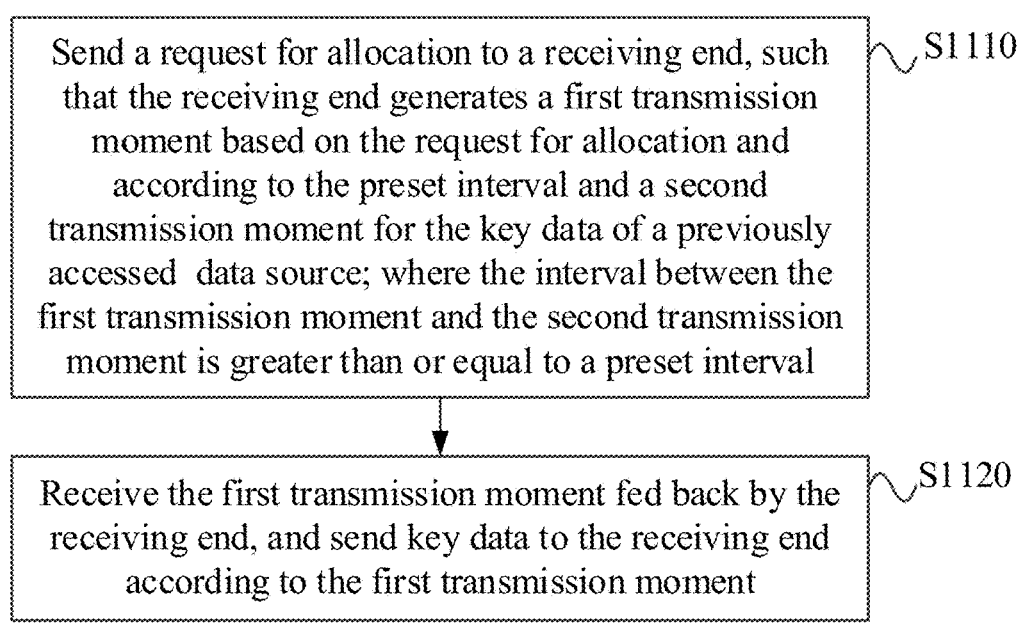
FIG. 12 depicts a flowchart showing a method for data transmission according to an embodiment of the present disclosure.

FIG. 12 depicts a flowchart showing a method for data transmission according to an embodiment of the present disclosure. The method is applied to a newly accessed data source, and includes but is not limited to operations S1110 and S1120.

At S1110, a request for allocation is sent to a receiving end, such that the receiving end generates a first transmission moment based on the request for allocation and according to the preset interval and a second transmission moment for the key data of a previously accessed data source; where the interval between the first transmission moment and the second transmission moment is greater than or equal to a preset interval.

At S1120, the first transmission moment fed back by the receiving end is received, and key data is sent to the receiving end according to the first transmission moment.

In an implementation, during an initial access, a newly accessed data source sends a request for allocation to a receiving end. The receiving end receives the request for allocation from the newly accessed data source, obtains a second transmission moment of key data of the previously accessed data source according to the request for allocation. Then the receiving end generates a first transmission moment according to the second transmission moment and a preset interval, where the interval between the first transmission moment and the second transmission moment is greater than or equal to the preset interval. Then, the receiving end sends the first transmission moment to the newly accessed data source. The newly accessed data source receives the first transmission moment fed back by the receiving end and transmits the key data to the receiving end according to the first transmission moment. From the above description, it can be seen that the newly accessed data source does not directly send the key data during the initial access, instead, the newly accessed data source sends a request for allocation to the receiving end, such that the receiving end allocates the first transmission moment for the key data for the newly accessed data source. Since the interval between the first transmission moment and the second transmission moment is greater than or equal to the preset interval, the collision between the key data from the newly accessed data source and the key data from the previously accessed data source due to time conflict can be alleviated. Therefore, according to an embodiment of the present disclosure, reliable transmission of more data information under the condition of limited bandwidth and an increase in the number of channels for data transmission is possible.

It is to be noted that the implementation and corresponding technical effects of the method for data transmission applied to the data source side described in the embodiment shown in FIG. 12 correspond to those of the method for data transmission applied to the receiving end described in the embodiments shown in FIGS. 10 to 11.

Figure 13:
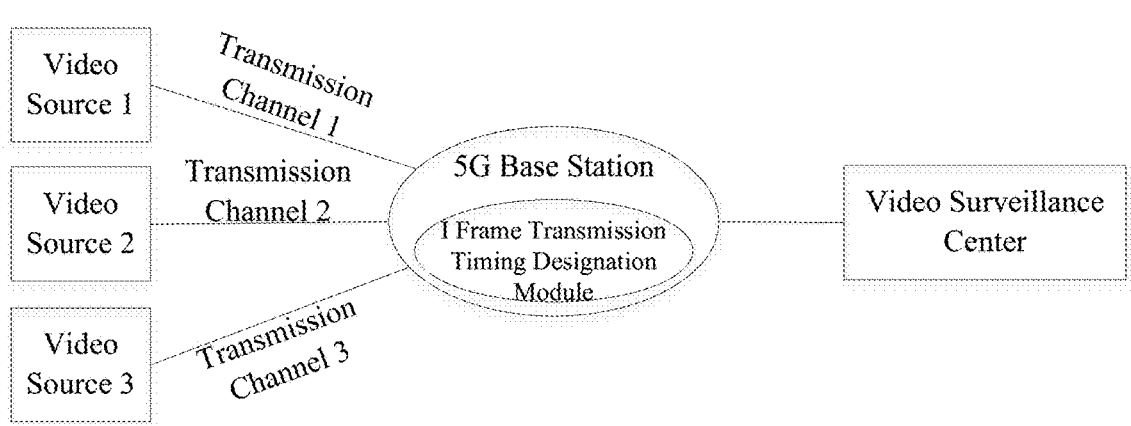
FIG. 13 depicts a schematic diagram showing a system architecture according to another embodiment of the present disclosure.

An embodiment regarding an entire system is provided below based on the method for data transmission described with respect to FIGS. 10 to 12. FIG. 13 depicts a schematic diagram showing an architecture of another system according to an embodiment of the present disclosure.

In an embodiment, a system with a 5G base station is illustrated by way of an example. In an embodiment of the present disclosure, an I frame transmission timing designation module is additionally provided in the 5G system. A video source, when initially accessing the 5G system, first applies to the I frame transmission timing designation module to designate the time when the I frames shall be transmitted for the video source. The I frame transmission timing designation module designates the time when the I frames shall be generated and transmitted to the video source according to the I-frame interval and the time for transmission of the I frames existing in the system, and notifies the newly accessed video source. Then the newly accessed video source transmits the I frames according to the time when the I frames shall be generated and transmitted designated by the I frame transmission timing designation module.

It shall be noted that in an embodiment of the present disclosure, the I-frame conflict detection module and the regulation module can be embedded in the 5G system or deployed between the video source and the 5G system.

As can be seen from the embodiment regarding FIGS. 5 to 13 as described above, in an embodiment of the present disclosure, the following two schemes are utilized to avoid the concurrent transmission of I frames as much as possible to achieve more reliable channels with limited bandwidth.

The first one is that, according to an embodiment of the present disclosure, I frame detection is performed on all the video streams accessing the transmission system. The times when the I frames are generated are regulated for the video sources according to the I frame detection situation and the current transmission situation of I frames of the transmission channel, so as to evenly arrange the times at which the I frames are transmitted over the transmission channel, to reduce the chances where the transmissions of the I frames collide, or even eliminating the collision.

The second one is that, in a transmission system according to an embodiment of the present disclosure, such as a RAN system, the 5G transmission system can regulate the video sources accessing the transmission system, such as the 5G transmission system, so as to generate and transmit the I frames at designated times, according to the principle that the times at which the I frames are transmitted over the transmission channel are evenly distributed, to reduce the chances where the transmissions of the I frames collide, or even eliminating the collision.

According to an embodiment of the present disclosure, the above two schemes are employed to evenly arrange the times when the I frames are transmitted over the transmission channel to reduce the chances where the transmissions of the I frames collide, or even the collision is eliminated. Hence, the non-fluency in the video playback is reduced or even eliminating, and thus the video quality is improved, and the number of transmission channels such as the 5G base station video transmission channels is increased.

An example is illustrated where a video with feature A is transmitted over a 100 Mbps transmission channel. If the transmission of the P frame is not considered, when more than three channels of videos are transmitted, video jitter may occur due to I-frame collision, and the video quality is poor, under the condition that the scheme according to an embodiment of the present disclosure is not employed. In contrast, in the case where the I frames are periodically transmitted every 2.5 seconds, (2.5s/100 ms)*2=50 channels of videos can be transmitted over the 100 Mbps transmission channel under the condition that the scheme according to an embodiment of the present disclosure is employed, and the effect is better than the existing technical schemes.

It should be noted that the scheme according to an embodiment of the present disclosure, can not only solve the collision of the I-frames in the videos, but also can be intended for other services such as voice or services in similar scenes.

Based on the above-described method for data transmission, several embodiments regarding a controller, a receiving end, a data source, and a computer-readable storage medium are provided below.

In an embodiment of the present disclosure, there is provided a controller, which includes a memory, a processor and a computer program stored in the memory and executable by the processor which, when executed by the processor causes the processor to carry out any one of the methods as described above.

It can be understood that, the processor and the memory may be connected by a bus or other means.

It should be noted that the controller described in this embodiment can correspond to the system architecture platform in the embodiment shown in FIG. 4, and can constitute a part of the system architecture platform in the embodiment shown in FIG. 4, both of which belong to the same inventive concept, so they have the same principle and beneficial effects, and will not be described in detail here.

Non-transitory software programs and instructions for the method for data transmission described in any one of the above embodiments are stored in a memory which, when executed by a processor, causes the processor to carry out the method for data transmission, e.g., the operations described in conjunction with FIGS. 5 through 8, or the operations described in conjunction with FIGS. 10 through 12.

It is to be noted that the implementation and corresponding technical effects of the controller in this embodiment of the present disclosure can be referred to the embodiments as described with respect to the method for data transmission described above.

In an embodiment of the present disclosure, there is provided a receiving end, which includes a memory, a processor, and a computer program stored in the memory and executable by the processor which, when executed by the processor causes the processor to carry out any one of the methods as described above.

It can be understood that, the processor and the memory may be connected by a bus or other means.

It should be noted that the receiving end described in this embodiment can correspond to the system architecture platform in the embodiment shown in FIG. 4, and can constitute a part of the system architecture platform in the embodiment shown in FIG. 4, both of which belong to the same inventive concept, so they have the same principle and beneficial effects, and will not be described in detail here.

Non-transitory software programs and instructions for the method for data transmission described in any one of the above embodiments are stored in a memory which, when executed by a processor, causes the processor to carry out the method for data transmission, e.g., the operations described in conjunction with FIGS. 5 through 7, or the operations described in conjunction with FIGS. 10 through 11.

It is to be noted that the implementation and corresponding technical effects of the receiving end in this embodiment of the present disclosure correspond to the embodiments as described with respect to the method for data transmission described above.

In an embodiment of the present disclosure, there is provided a data source, which includes a memory, a processor, and a computer program stored in the memory and executable by the processor which, when executed by the processor causes the processor to carry out any one of the methods as described above.

It can be understood that, the processor and the memory may be connected by a bus or other means.

It should be noted that the data source described in this embodiment can correspond to the system architecture platform in the embodiment shown in FIG. 4, and can constitute a part of the system architecture platform in the embodiment shown in FIG. 4, both of which belong to the same inventive concept, so they have the same principle and beneficial effects, and will not be described in detail here.

Non-transitory software programs and instructions for the method for data transmission described in any one of the above embodiments are stored in a memory which, when executed by a processor, causes the processor to carry out the method for data transmission, e.g., the operations described in conjunction with FIG. 8, or described in conjunction with FIG. 12.

It is to be noted that the implementation and corresponding technical effects of the data source in this embodiment of the present disclosure correspond to the embodiments as described with respect to the method for data transmission described above.

In an embodiment of the present disclosure, there is provided a computer-readable storage medium, which stores computer-executable instructions which, when executed by a processor, causes the processor to carry out the operations of the method described above, for example, the above operations described with respect to FIGS. 5 to 8, FIG. 10 to FIG. 12.

An embodiment of the present disclosure involves the following operations. The receiving end obtains the first transmission moment of the key data from the newly accessed data source and the second transmission moment of the key data from a previously accessed data source. When the interval between the first transmission moment and the second transmission moment is less than a preset interval, the receiving end generates a new first transmission moment according to the second transmission moment and the preset interval, where the interval between the new first transmission moment and the second transmission moment is greater than or equal to the preset interval. Then, the receiving end sends the new first transmission moment to the newly accessed data source, such that the newly accessed data source transmits the key data to the receiving end according to the new first transmission moment. According to the technical scheme of an embodiment of the present disclosure, the receiving end generates and sends the new first transmission moment to the newly accessed data source, such that the newly accessed data source transmits the key data to the receiving end according to the new first transmission moment. Since the interval between the new first transmission moment and the second transmission moment is greater than or equal to the preset interval, the collision between the transmissions of the key data from the newly accessed data source and the key data from the previously accessed data source due to time conflict can be reduced. Thereby, according to an embodiment of the present disclosure, it is possible to reliably transmit more data information under the condition of limited bandwidth, thus increasing the number of channels for data transmission.

It shall be appreciated by a person having ordinary skills in the art that all or some of the steps and systems disclosed above can be implemented as software, firmware, hardware and their appropriate combinations. Some or all physical components can be implemented as software executed by a processor, such as a central processing unit, a digital signal processor or a microprocessor, or as hardware, or as an integrated circuit, such as an application-specific integrated circuit. Such software can be distributed on computer-readable media, which can include computer storage media (or non-transitory media) and communication media (or transitory media). As is well known to a person having ordinary skills in the art, the term computer storage medium includes volatile and nonvolatile, removable and non-removable medium implemented in any method or technology for storing information such as computer-readable instructions, data structures, program modules or other data. Computer storage medium includes, but is not limited to, RAM, ROM, EEPROM, flash memory or other memory technologies, CD-ROM, digital versatile disks (DVD) or other optical disk storage, magnetic boxes, tapes, magnetic disk storage or other magnetic storage devices, or any other medium that can be configured to store desired information and accessible by a computer. Furthermore, it is well known to ta person having ordinary skills in the art that communication media usually contains computer-readable instructions, data structures, program modules or other data in modulated data signals such as carrier waves or other transmission mechanisms, and can include any information delivery media.

Described above is a description of several embodiments of the present disclosure, but the present disclosure is not limited to the above embodiments. Those having ordinary skills in the art can make various equivalent modifications or substitutions without departing the scope of the present disclosure, and these equivalent modifications or substitutions are within the scope defined by the claims of the present disclosure.

What is claimed is:

1. A method for data transmission, applied to a receiving end, the method comprising,
    acquiring a first transmission moment for key data of a newly accessed data source, and a second transmission moment for the key data of a previously accessed data source;
    generating a new first transmission moment according to the second transmission moment and a preset interval, in response to an interval between the first transmission moment and the second transmission moment being less than the preset interval;
wherein the interval between the new first transmission moment and the second transmission moment is greater than or equal to the preset interval; and
sending the new first transmission moment to the newly accessed data source, such that the newly accessed data source transmits the key data to the receiving end according to the new first transmission moment.

2. The method as claimed in claim 1, wherein after acquiring the first transmission moment for the key data of the newly accessed data source, and the second transmission moment for the key data of the previously accessed data source, the method further comprises,
receiving the key data sent by the newly accessed data source according to the first transmission moment, in response to the interval between the first transmission moment and the second transmission moment being greater than or equal to the preset interval.

3. The method as claimed in claim 1, wherein after sending the new first transmission moment to the newly accessed data source, the method further comprises,
receiving the key data, and reference data corresponding to the key data from the newly accessed data source;
wherein the key data is sent by the newly accessed data source according to the new first transmission moment; and
sending the key data and the reference data to a terminal device.

4. The method as claimed in claim 1, wherein each of the previously accessed data source and the newly accessed data source is one of, a video and picture data source, or an audio data source.

5. A receiving end, comprising a memory, a processor, and a computer program stored in the memory and executable by the processor which, when executed by the processor causes the processor to carry out the method as claimed in claim 1.

6. A non-transitory computer-readable storage medium storing a computer-executable instruction which, when executed by a processor, causes the processor to carry out the method as claimed in claim 1.

7. The receiving end as claimed in claim 6, wherein after acquiring the first transmission moment for the key data of the newly accessed data source, and the second transmission moment for the key data of the previously accessed data source, the method further comprises,
receiving the key data sent by the newly accessed data source according to the first transmission moment, in response to the interval between the first transmission moment and the second transmission moment being greater than or equal to the preset interval.

8. The receiving end as claimed in claim 6, wherein after sending the new first transmission moment to the newly accessed data source, the method further comprises,
receiving the key data, and reference data corresponding to the key data from the newly accessed data source;
wherein the key data is sent by the newly accessed data source according to the new first transmission moment; and
sending the key data and the reference data to a terminal device.

9. A method for data transmission, applied to a receiving end, the method comprising,
receiving a request for allocation from a newly accessed data source, and acquiring a second transmission moment for key data of a previously accessed data source according to the request for allocation;
generating a first transmission moment according to the second transmission moment and a preset interval;
wherein an interval between the first transmission moment and the second transmission moment is greater than or equal to the preset interval; and
sending the first transmission moment to the newly accessed data source, such that the newly accessed data source transmits the key data to the receiving end according to the first transmission moment.

10. The method as claimed in claim 9, wherein after sending the first transmission moment to the newly accessed data source, the method further comprises,
receiving the key data, and reference data corresponding to the key data from the newly accessed data source;
wherein the key data is sent by the newly accessed data source according to the first transmission moment; and
sending the key data and the reference data to a terminal device.

11. The method as claimed in claim 9, wherein each of the previously accessed data source and the newly accessed data source is one of, a video and image data source, or an audio data source.

12. A receiving end, comprising a memory, a processor, and a computer program stored in the memory and executable by the processor which, when executed by the processor causes the processor to carry out the method as claimed in claim 9.

13. The receiving end as claimed in claim 12, wherein after sending the first transmission moment to the newly accessed data source, the method further comprises,
receiving the key data, and reference data corresponding to the key data from the newly accessed data source;
wherein the key data is sent by the newly accessed data source according to the first transmission moment; and
sending the key data and the reference data to a terminal device.

14. A non-transitory computer-readable storage medium storing a computer-executable instruction which, when executed by a processor, causes the processor to carry out the method as claimed in claim 9.

15. A method for data transmission, applied to a newly accessed data source, the method comprising,
sending key data to a receiving end, such that the receiving end compares a first transmission moment for the key data of the newly accessed data source with a second transmission moment for the key data of a previously accessed data source; and
receiving a new first transmission moment fed back by the receiving end, and sending the key data to the receiving end according to the new first transmission moment;
wherein the new first transmission moment is generated by the receiving end in response to an interval between the first transmission moment and the second transmission moment being less than a preset interval, and
the interval between the new first transmission moment and the second transmission moment is greater than or equal to the preset interval.

16. The method as claimed in claim 15, wherein each of the previously accessed data source and the newly accessed data source is one of, a video and image data source, or an audio data source.

17. A data source, comprising a memory, a processor, and a computer program stored in the memory and executable by the processor which, when executed by the processor causes the processor to carry out the method as claimed in claim 15.

18. A non-transitory computer-readable storage medium storing a computer-executable instruction which, when executed by a processor, causes the processor to carry out the method as claimed in claim 15.

* * * * *